C. L. CROW.
ANTISLIPPING ARMORED PNEUMATIC TIRE.
APPLICATION FILED NOV. 10, 1914.
1,226,862. Patented May 22, 1917.
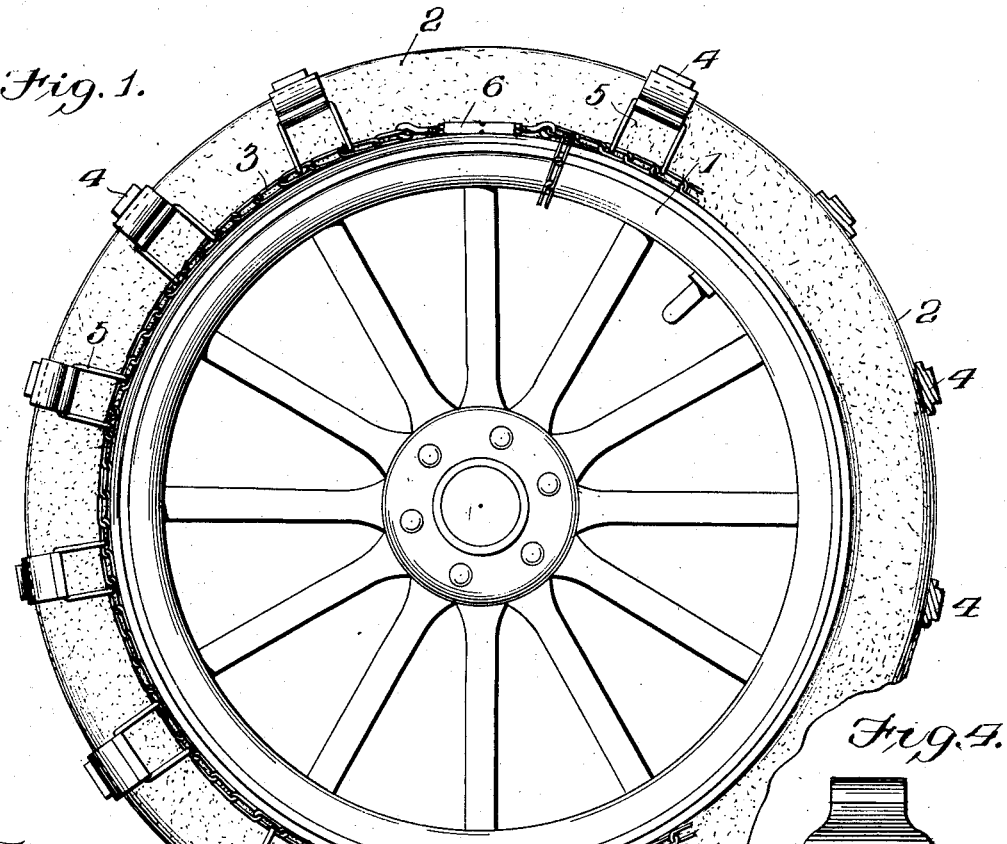
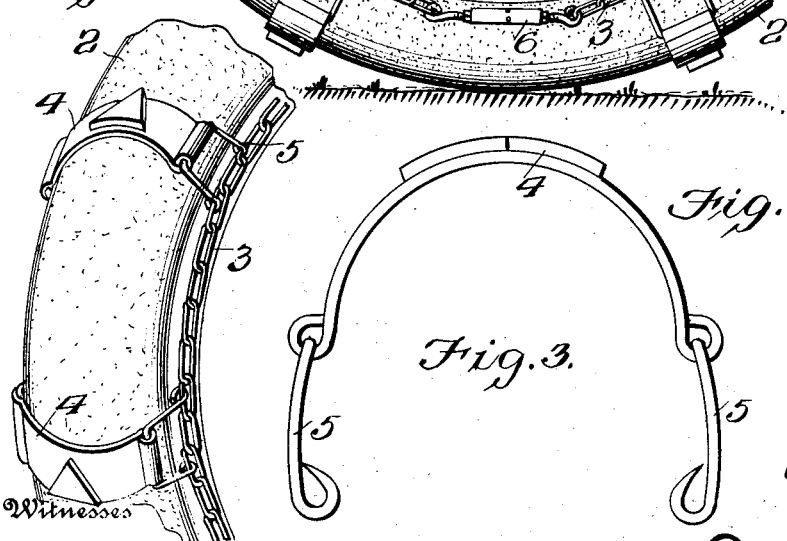
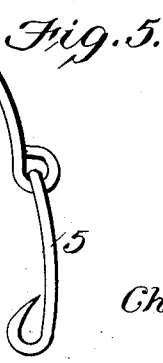
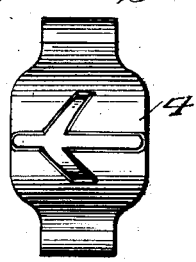
Inventor
Charles L. Crow.

UNITED STATES PATENT OFFICE.

CHARLES L. CROW, OF ALEXANDER CITY, ALABAMA.

ANTISLIPPING ARMORED PNEUMATIC TIRE.

1,226,862.  Specification of Letters Patent.  Patented May 22, 1917.

Application filed November 10, 1914. Serial No. 871,320.

*To all whom it may concern:*

Be it known that I, CHARLES L. CROW, a citizen of the United States of America, residing at Alexander City, in the county of Tallapoosa and State of Alabama, have invented certain new and useful Improvements in Antislipping Armored Pneumatic Tires, of which the following is a specification.

This invention relates to anti-skidding armor for automobile tires, and its prime object is to provide a device of this character which, while effective and durable, will be simple, inexpensive, easily adjusted and readily tightened-up and kept taut.

These useful and highly desirable ends are attained by means and use of the novel parts and combination and arrangement of parts herein described and claimed.

Reference is made to the accompanying drawings which form part of this specification, in which like characters of reference denote like parts in all the figures and in which—

Figure 1 is an elevation of an automobile-wheel equipped with my invention;

Fig. 2 is a perspective detail-view of a portion of the tire with the armor positioned thereon;

Fig. 3 is a cross-sectional view through one of my metallic anti-skidding units, showing means for making same secure to the inner and outer stay-chains;

Fig. 4 is a plan-view, showing the ground-face of one of my metallic anti-skidding units equipped with a modified form of my anti-skidding lug, and Fig. 5 is a plan-view, showing a further modified form of anti-skidding lug.

Referring specifically to the drawings, 1 designates an automobile-wheel; 2 a rubber-tire in place around the wheel; 3 inner and outer stay chains arranged around the wheel near the base of the tire; 4 curved metallic anti-skidding units which are provided with peculiarly shaped surface-lugs, passed across the face of the tire and made-fast to the chains; 5 rectangular bails which are adapted to pass through the ends of the anti-skidding units and provided with end-hooks to engage the said stay-chains, and 6 right-and-left hand threaded turn buckles which are detachably connected with and form part of, the said stay-chains for the purposes of taking-up slack and keeping the said chains taut all the time. Each turn-buckle embodies a pair of chain-engaging hooks and a connecting-barrel provided with means to permit of its being turned to secure tightening of the chains.

Said metallic anti-skidding units are formed of elongated flat pieces of metal which are curved in transverse adjustment across the surface of the tire to fit snugly around the contour thereof, and have their outer or ground faces raised, as preferred, into triangular shaped or drooping cross shaped formations as shown in Figs. 4 and 5, and their transverse sides or wings extended narrowingly toward their outer ends or lateral extremities which are curved back upon themselves into transverse circular grooves through which are adapted to pass the upper sides of the rectangular bails, 5, the free-ends of said bails being provided with integral self-formed hooks which are adapted to engage links of the inner and outer disposed stay or retaining chains, 3.

To equip a tire with my invention, I pass the curved metallic anti-skidding units around the outer-surface of the tire, having first made the said units fast to the two stay-chains, and then I adjust the units in place and take-up the slack in the said stay-chains by use of the said right-and-left hand threaded turn buckles mounted between the two or more parts into which the said chain is divided.

Having fully described and explained my invention, what I claim and desire to cover and claim by Letters-Patent is:

An anti-slipping device for resilient tires comprising a plurality of shoes arranged at intervals on the tire, a single lug formed on each of the said shoes adapted to substantially span the tread surface of the tire, said lug consisting of a cross cleat having a long arm extending longitudinally of the tread surface of the tire, and oppositely arranged short arms positioned transversely of the tread surface of the tire and angularly disposed with relation to the long arm, and means for securing the said shoes on the tire.

In testimony whereof I affix my signature in presence of two witnesses.

CHARLES L. CROW.

Witnesses:
L. A. HARRIS,
L. S. HUNTER.